(12) United States Patent
Ross et al.

(10) Patent No.: US 12,715,459 B2
(45) Date of Patent: Aug. 25, 2026

(54) SYSTEM FOR MONITORING AN EVENT CHAIN INCLUDING COMPONENTS FOR CARRYING OUT AT LEAST ONE SEMI-AUTOMATED DRIVING FUNCTION OF A MOTOR VEHICLE AND METHOD FOR OPERATING THE SYSTEM

(71) Applicant: Robert Bosch GmbH, Stuttgart (DE)

(72) Inventors: Hans-Leo Ross, Lorsch (DE); Lucas Heil, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 654 days.

(21) Appl. No.: 17/896,256

(22) Filed: Aug. 26, 2022

(65) Prior Publication Data

US 2023/0075731 A1 Mar. 9, 2023

(30) Foreign Application Priority Data

Sep. 3, 2021 (DE) ..................... 10 2021 209 684.0

(51) Int. Cl.
*B60W 50/06* (2006.01)
*H04L 7/00* (2006.01)
*H04L 12/40* (2006.01)

(52) U.S. Cl.
CPC ........... *B60W 50/06* (2013.01); *H04L 7/0012* (2013.01); *H04L 12/40032* (2013.01); *H04L 2012/40273* (2013.01)

(58) Field of Classification Search
CPC ............................ B60W 50/06; H04L 7/0012; H04L 12/40032; H04L 2012/40273
(Continued)

(56) References Cited

U.S. PATENT DOCUMENTS 4,507,784 A * 3/1985 Procter ............... G06F 11/0751 714/E11.002
6,611,755 B1 * 8/2003 Coffee ...................... B28C 9/00 455/526
(Continued)

FOREIGN PATENT DOCUMENTS

DE 102019219800 A1 * 6/2021 ................ B60T 7/22
EP 3613648 B1 * 6/2023 ............ B60W 50/00
(Continued)

OTHER PUBLICATIONS

Spurný, Vojtěch et al. "Cooperative Autonomous Search, Grasping, and Delivering in a Treasure Hunt Scenario by a Team of Unmanned Aerial Vehicles." Journal of field robotics 36.1 (2019): 125-148. Web. (Year: 2019).*

(Continued)

*Primary Examiner* — Erin D Bishop
*Assistant Examiner* — Keith A von Volkenburg
(74) *Attorney, Agent, or Firm* — NORTON ROSE FULBRIGHT US LLP

(57) ABSTRACT

A system for monitoring an event chain including components for carrying out an automated driving function of a motor vehicle. A data switching unit is configured for switching a data exchange between at least one first and one second component. The monitoring module checks whether a monitoring signal to the second component is received by the second component at a basic clock rate. The data switching unit receives a receiving clock requirement, within which data are to be received by the second component, and transfers it, to the second component, at a basic clock rate corresponding to the receiving clock requirement or an integer multiple of the basic clock rate corresponding to the receiving clock requirement. A monitoring module is configured to check whether data transferred to the second
(Continued)

component are received in the receiving clock requirement, and to release those for use by the second component.

15 Claims, 3 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 8,963,900 | B2 * | 2/2015 | Liu | G09G 3/3677 345/204 |
| 10,788,841 | B2 * | 9/2020 | Zhang | G01S 19/14 |
| 11,746,499 | B1 * | 9/2023 | Kotlaba | G05D 3/12 701/23 |
| 11,975,714 | B2 * | 5/2024 | Wang | H04Q 9/00 |
| 11,981,363 | B1 * | 5/2024 | Dunn | B61L 3/127 |
| 11,987,286 | B2 * | 5/2024 | Imai | G05D 1/249 |
| 12,022,769 | B2 * | 7/2024 | Mccutcheon, IV | H04N 23/90 |
| 12,314,422 | B2 * | 5/2025 | Jayaprakash | G06F 21/6245 |
| 2004/0189366 | A1 * | 9/2004 | Haringer | H03K 5/1504 327/233 |
| 2005/0135465 | A1 * | 6/2005 | Andrus | H04L 25/493 375/220 |
| 2006/0015231 | A1 * | 1/2006 | Yoshimura | B60L 3/0076 701/1 |
| 2008/0037693 | A1 * | 2/2008 | Andrus | H04L 25/4904 375/359 |
| 2017/0068295 | A1 * | 3/2017 | Yang | G06F 1/324 |
| 2021/0129842 | A1 * | 5/2021 | Wang | H04L 67/12 |

FOREIGN PATENT DOCUMENTS

| | | | | |
|---|---|---|---|---|
| KR | 20240019268 | A * | 6/2022 | |
| TW | 201941005 | A * | 10/2019 | G05B 19/042 |
| WO | WO-2008026283 | A1 * | 3/2008 | G06F 11/0757 |
| WO | WO-2012101229 | A1 * | 8/2012 | H04J 3/0652 |
| WO | WO-2022169612 | A1 * | 8/2022 | H04J 3/025 |

OTHER PUBLICATIONS

Drexl, Michael. "Synchronization in Vehicle Routing—A Survey of VRPs with Multiple Synchronization Constraints." Transportation science 46.3 (2012): 297-316. Web. (Year: 2012).*

Kim, Hyeong Jun et al. "Time-Synchronization Method for CAN-Ethernet Networks with Gateways." Applied sciences 10.24 (2020):8873-. Web. (Year: 2020).*

* cited by examiner 100
10
20
30
L1
L2
S
A
1
detection device
2
sending device
11
receiving device
12
detection device
13
control unit
data switching unit
31, 200
1a
detection module
1b
publication module
3
first data switching module
2a
2b
4
first monitoring device
14
second data switching module
11a
11b
15
12a
subscription module
12b
control unit
data switching unit
32, 200

Fig. 2

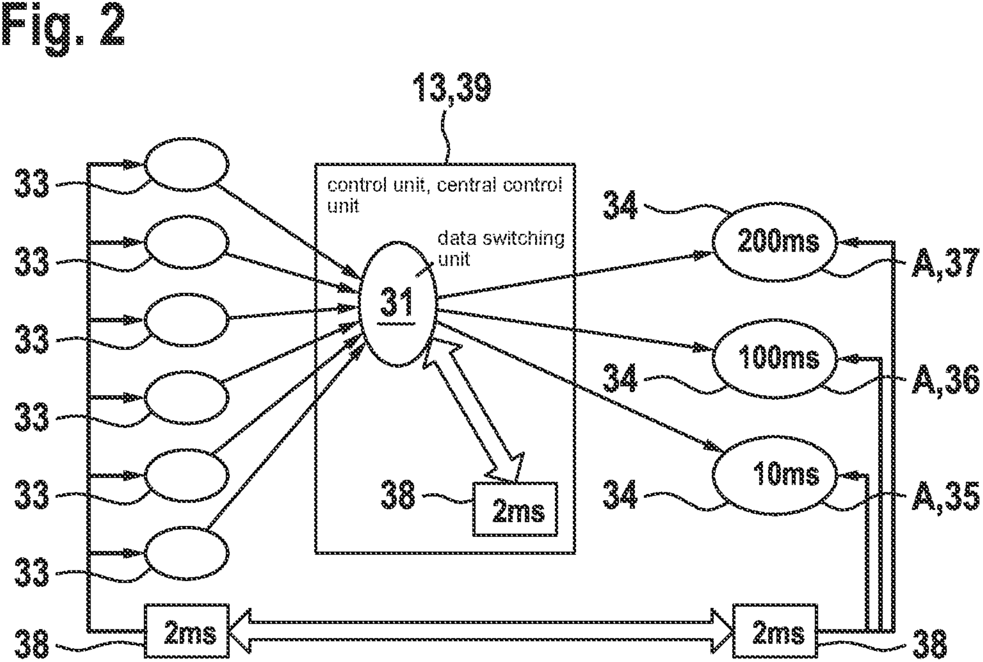

Fig. 3

40 check whether monitoring signal is received — 41 provide receiving clock requirement — 42 receive receiving clock requirement — 43 transfer sending clock requirement — 44 receive data by data switching unit — 45 assign portion of data to second component — 46 transfer assigned data — 47

48 — data received?

50 — transfer error message

51 — transfer data

49 — use data for carrying out driving function

SYSTEM FOR MONITORING AN EVENT CHAIN INCLUDING COMPONENTS FOR CARRYING OUT AT LEAST ONE SEMI-AUTOMATED DRIVING FUNCTION OF A MOTOR VEHICLE AND METHOD FOR OPERATING THE SYSTEM

FIELD

The present invention relates to a system for monitoring an event chain including components for carrying out at least one semi-automated driving function of a motor vehicle, to a method for operating the system, and to a computer program product for carrying out the method.

BACKGROUND INFORMATION

Conventional, traditional safeguarding measures do not necessarily work in modern distributed control systems. In particular, in the case of cloud networks or in "non-von-Neumann architectures" and also in the case of novel control and processor architectures, quantum computers etc., traditional safeguarding measures based on an input-process-output (IPO) principle no longer work.

In a typical AUTomotive Open System ARchitecture (AUTOSAR®), control units and communication are still largely based on the IPO principle, the control units typically communicating with a CAN, a Flexray® or an Ethernet connection via point-to-point links.

In a service-oriented architecture or even on microprocessor systems including, for example, a portable operating system interface (POSIX®) architecture, a service-oriented approach is typically used. This becomes a particular problem with linked services, such as they are used, for example, in a cloud for security measures, for example for authenticating a multitude of users, for example with the aid of a System for Cross-domain Identity Management (SCIM™).

To have the option of also enabling automated driving in the higher automation levels, for example Level 5 (fully automated without a driver in the vehicle), all systems in the vehicle must also be available in the event of an error, making a redundancy indispensable. In particular, in the case of redundant systems, a synchronization is necessary so that the redundant system is able to switch or may be switched into an active control mode in a timely manner, in particular, in the case of errors or implausible states between a control unit and an actuator.

In an AUTOSAR® architecture, the task of a basic software (BSW) module is to adapt input data and output data with the aid of a so-called abstraction layer in such a way that these may be processed correctly and functionally reliably in the particular processing levels without error influences. Each control unit may send different pieces of information to downstream control units. For example, pieces of information about physical variables, such as, for example, a brake pressure, a torque, an angle etc., pieces of information about objects, for example of objects detected within the scope of a perception, vectors for a movement, various scenarios and events, and other semantic encodings may be sent in this way. Also, a context for detected objects, for example a presence of an open space or pieces of information about movement behaviors of objects or obstacles may be detected.

A selective timely coordination of data is not only necessary for the Car2Infrastructure (C2X) communication. In real-time systems having corresponding availability requirements, such a data coordination all the way to the actuator is necessary, for example in the case of a steering system receiving relevant data too late or even in a distorted manner, which may result in accidents. If the steering system receives conflicting data in two or more independent ways, an unambiguous and correct function of the steering system cannot be guaranteed.

Furthermore, there are a growing number of cascaded control loops for steering and braking systems. In particular, in the control loops, a synchronization at the actuator is required so that redundant structures, for example, also have to be able to inform about a failure or an error state in a timely manner and respond appropriately. For example, a controller in a steering system is typically operated at a time basis of 10 ms, which is why a real-time synchronization is required for the particular controller and its controller cascades via a detection of context surroundings (e.g., a road and its condition) with the aid of at least one sensor. In particular, in such control loops and their cascades, the reference variables and the disturbance variables must be temporally matched to one another.

An actuator furthermore requires information as to the source from which control data stem, how old they are, and which value is the correct value for an actuation, i.e., for the at least one automated driving function. This is both relevant for an operational safety and with respect to an information reliability. Based on this combination of information, for example, a steering system or a brake may be activated. The actuators in the vehicle require very different data from different sources depending on the position of the vehicle, weather conditions, road conditions, traffic conditions etc. These data must be available in a timely manner and also for all involved components. Certain mechanisms are necessary for this purpose, which control and monitor data flows accordingly.

In this way, active time-controlled safety mechanisms become necessary to ensure data for an actuator control (as a reference variable or as feedback) in a timely and time-synchronous manner for a coordinated response at a redundant actuator. A mechanism has to be implemented at a final element, for example at an actuator determining a vehicle response, which ensures the time horizon in the final element and is able to dynamically switch.

SUMMARY

It is an object of the present invention to provide an enhanced system for monitoring an event chain including components for carrying out at least one semi-automated driving function of a motor vehicle, to provide a method for operating the system, and to provide a computer program product for carrying out the method. This object may be achieved in each case by a system for monitoring an event chain including components for carrying out at least one semi-automated driving function of a motor vehicle, by a method for operating the system, and by a computer program product for carrying out the method, each having the features of the present invention. Advantageous refinements of the present invention are disclosed herein.

According to an example embodiment of the present invention, a system for monitoring an event chain including components for carrying out at least one semi-automated driving function of a motor vehicle includes a data switching unit and a monitoring module. The data switching unit is configured for switching a data exchange between at least one first component within the event chain and at least one second component within the event chain. The monitoring module is configured to check whether a monitoring signal is received via a data link to the second component at a basic clock rate by the second component. The data switching unit is configured to receive, from the second component, a receiving clock requirement, within which data are to be received from the second component, and to transfer data, to the second component, at a basic clock rate corresponding to the receiving clock requirement or an integer multiple of the basic clock rate corresponding to the receiving clock requirement. The monitoring module is configured to check whether data transferred to the second component are received in the receiving clock requirement, and to release data received in the receiving clock requirement for use by the second component.

The system is based on the idea that the second component is able to receive the data in a timely manner for carrying out the at least one semi-automated driving function. The basic clock rate represents a heartbeat for transferring the monitoring signal to the second component. In this way, it is ensured that the data link to the second component is functional. In this way, a reliable time basis may be provided to the second component for carrying out a synchronization of redundant components, and for activating data flows to the second component and away from the second component. The monitoring module may also be referred to as a heartbeat module for this reason. The monitoring signal may also be referred to as a heartbeat signal. Using the image of humans, this corresponds to the sinus node, on whose basis further time-dependent functions are initiated in integer multiples of a base frequency as well as in fractions of the base frequency, synchronized, and monitored for temporal aspects.

According to an example embodiment of the present invention, a data flow is advantageously correctly and reliably ensured by the data switching unit. As a result of the data switching unit being configured to transfer data to the second component at time intervals which correspond to an integer multiple of the basic clock rate, the data are received by the second component in a time-synchronous manner with the aid of an incoming monitoring signal, i.e., in a time-synchronous manner with a "heartbeat." If this should not be the case, an error in the event chain may be inferred, and the error may be responded to in a timely manner.

In this way, the monitoring module also forms a basis, by which a data flow may be monitorable and may reliably be dynamically adaptable to the particular requirements. In this way, a system is advantageously provided which is able to meet defined requirements with respect to functional safety. Advantageously, the heartbeat principle may be implemented along the entire event chain. In this way, errors in the entire event chain, i.e., for example, also within the scope of a communication between an automated motor vehicle and infrastructure elements, may be identified and controlled in a timely manner. A CAN bus may be used, for example, for a data exchange between the components of the event chain, which, however, is not absolutely necessary.

In one specific example embodiment of the present invention, the components of the event chain include elements from the following group of elements: sensor, transmitting device, receiving device, detection device, control unit, actuator. The components, however, may also be designed as other elements. In one specific embodiment, the second component is an actuator.

The actuator is configured to receive reference variables, disturbance variables and/or redundant parameters and to carry out the at least one semi-automated driving function of the motor vehicle based on the reference variables, the disturbance variables, and the redundant parameters.

For example, the actuator may be designed as a braking device, as a steering device, or also as a drive. Advantageously, a functional safety in redundant real-time networks all the way to a final response of an actuator, in particular, of highly available actuators, which possibly have to be able to be synchronized with one another, may be ensured in this way. In the event of an error, activation is possible with the aid of the reconfiguration of redundant branches, for example in the event of a malfunction of a controller, controllers remaining at an actuator may compensate for the malfunction so that no abnormalities with respect to an actuator are establishable.

Advantageously, it is possible that data are received at redundant controllers or actuators in a clock-synchronous manner so that, in the event of an error, an accordingly coordinated counter-response may be initiated. In the case of a redundant steering system and a failure of a redundancy, a still available redundant steering device has to steer to the right more forcefully, i.e., using a higher torque, when a steering maneuver to the right is requested. At higher velocities, this process also has to be carried out within a shorter duration since otherwise, in the event of a redundancy failure, this may result in a significant departure from a traffic lane.

In one specific example embodiment of the present invention, the data switching unit is configured to transfer, to the first component, a sending clock requirement, which corresponds to no more than the receiving clock requirement and in which the first component is to send data to the data switching unit. Advantageously, data may thus be sent from the first component in a timely manner to the data switching unit so that the data switching unit is, in turn, able to transfer the data received from the first component to the second component in a timely manner, i.e., in the receiving clock requirement.

The first component may, for example, be configured to send data to the data switching unit in a sending clock requirement corresponding to an integer multiple of the basic clock rate.

Advantageously, the data switching between the first component and the second component thus takes place in each case based on the basic clock rate or the heartbeat. Advantageously, a clock generator of the first component and a clock generator of the data switching unit may thus also be synchronized with one another.

In one specific example embodiment of the present invention, the second component is configured to provide the receiving clock requirement in the form of the basic clock rate or an integer multiple of the basic clock rate. Advantageously, a clock generator of the monitoring module and a clock generator of the data switching unit may thus be synchronized with one another.

In one specific example embodiment of the present invention, the data switching unit is configured for switching a data exchange between a multitude of first components within the event chain and a multitude of second components within the event chain. The data switching unit is configured to receive data sent by the first components, to assign in each case at least a portion of the received data to the second components, and to transfer the assigned data in each case to the second components.

In this way, it is advantageously ensured that the second component receives data required for carrying out the at least one automated driving function. The data switching unit may be an integral part of a control unit, for example. In one specific embodiment, the control unit is designed as a central control unit. For example, the central control unit may be designed as a so-called domain controller for driver assistance systems (DASy).

The data switching unit, however, may also be an integral part of a braking control unit, for example. A braking control unit has a very large number of heterogeneous functions, such as, for example, an anti-lock braking system (ABS), an electronic stability control program (ESP), or a traction control unit. Depending on the driving situation, weather conditions, or road conditions, greatly varying data are also needed from sensors outside the braking control unit for such functions. Advantageously, these may be transferred by the data switching unit of the braking control unit in a timely manner to second components, for example to actuators.

In one specific example embodiment of the present invention, the monitoring module is an integral part of the second component or is situated directly at the second component. Advantageously, errors in the transfer of the data between the second component and the monitoring module are thus prevented or reduced. For example, a latency may thereby be reduced since a transfer path is minimized. The monitoring module may be an integral part of an actuator, for example. If the actuator is a switch, for example, the monitoring module may be situated directly at the switch.

In one specific example embodiment of the present invention, the monitoring module is configured to transfer an error message to the data switching unit in the event that the data are not received by the second component in the receiving clock requirement. The data switching unit is configured to transfer data according to a principle established as secure to the second component, based on the error message.

A motor vehicle includes a system according to one of the specific embodiments of the present invention. The motor vehicle may also be referred to as an automated motor vehicle. Within the scope of the entire present description, an at least semi-automated driving function shall refer to an assisted driving function, a semi-automated driving function, a highly automated driving function, a fully automated driving function, or an autonomous driving function.

A method for operating a system according to one of the specific embodiments of the present invention includes the following method steps: It is checked whether a monitoring signal is received, by the second component, at a basic clock rate via a data link to the second component. A receiving clock requirement is received, within which data are to be received by the second component. Data are transferred to the second component at a basic clock rate corresponding to the receiving clock requirement or an integer multiple of the basic clock rate corresponding to the receiving clock requirement. It is checked whether data transferred to the second component are received in the receiving clock requirement. Data received in the receiving clock requirement are used to carry out the at least one semi-automated driving function. Advantageously, the described method may, for example, be used when operating an automated motor vehicle, in particular, in urban surroundings, and during the automated parking of the motor vehicle.

In one specific example embodiment of the present invention, the method includes the following additional method step: A sending clock requirement corresponding to no more than the receiving clock requirement is transferred to the first component. In one specific embodiment, the receiving clock requirement is provided in the form of an integer multiple of the basic clock rate. In one specific example embodiment of the present invention, data sent by the first component are received, at least a portion of the received data is assigned to the second component, and the assigned data are transferred to the second component.

In one specific example embodiment of the present invention, an error message is transferred in the event that the data are not received by the second component in the receiving clock requirement. Data are transferred according to a principle established as secure to the second component, based on the error message.

A computer program product encompasses commands which, during their execution on a computer, prompt the computer to carry out a method according to one of the specific embodiments of the present invention. The computer program product may, for example, be stored on a machine-readable memory medium.

The present invention is described in greater detail hereafter with further features and advantages based on schematic figures.

BRIEF DESCRIPTION OF THE DRAWINGS

FIG. 2 shows a data flow, switched by a data switching unit, between first and second components of the event chain, according to an example embodiment of the present invention.

FIG. 3 shows a schematic sequence of a method for operating the system, according to an example embodiment of the present invention.

DETAILED DESCRIPTION OF EXAMPLE EMBODIMENTS

Figure 1:
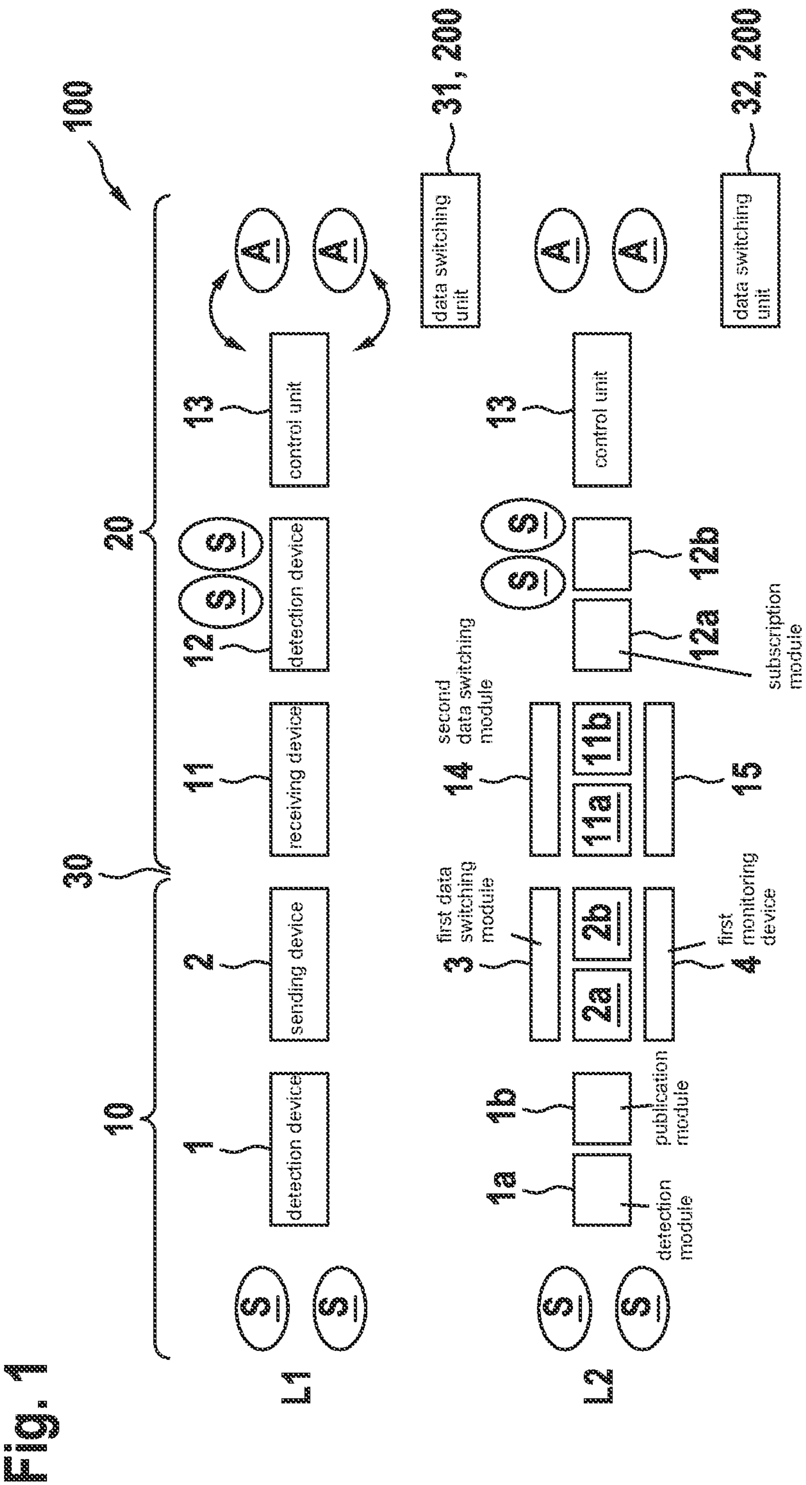
FIG. 1 shows a block diagram of an event chain for carrying out at least one semi-automated driving function of a motor vehicle and of a system for monitoring the event chain, according to an example embodiment of the present invention.

FIG. 1 schematically shows a block diagram of an exemplary event chain 100 including components for carrying out an at least semi-automated driving function of a motor vehicle 20 and a system 200 for monitoring event chain 100. FIG. 1 shows a first detailing degree L1 of event chain 100 and a second detailing degree L2 of event chain 100. FIG. 1, by way of example, shows an event chain 100 from a backend device 10 to the motor vehicle 20.

System 200 includes a data switching unit 31 and a monitoring module 32. Data switching unit 31 is configured for switching a data exchange between at least one first component within event chain 100 and at least one second component within event chain 100. The components of event chain 100 may, for example, include elements of event chain 100 shown in FIG. 1. A component of event chain 100 may, for example, be designed as a sensor S, as a sending device 2, as a receiving device 11, as a detection device 1, 12, as a control unit 13 or as an actuator A. A sensor S may, as shown in FIG. 1, be situated at the motor vehicle side or the infrastructure side. If a sensor S is situated on the infrastructure side, it may be an integral part of backend device 10, for example, which is configured to exchange data with motor vehicle 20 via an air interface 30 (e.g., mobile radio link, WLAN connection, etc.). In general, the components of event chain 100, however, do not necessarily each have to be connected to one another via an air interface. Detection device 1 and sending device 2 are also integral parts of backend device 10. Motor vehicle 20, for example, includes receiving device 11, a detection device 12, and a control unit 13. Moreover, motor vehicle 20 includes optional sensors S for detecting surroundings of motor vehicle 20 and actuators A.

In a detailing degree L2, the aforementioned components are apparent in a greater resolution. It is apparent that detection device 1 includes a detection module 1*a* and a publication module 1*b*, detection module 1*a*, in particular, being responsible for a data fusion, and publication module 1*b*, in particular, being responsible for publishing or offering data of detected objects. It is furthermore apparent that backend device 10 includes a first data switching module 3 and a first monitoring device 4. Moreover, sending device 2 includes a first security module 2*a* and a first communication module 2*b*. Receiving device 11 includes a second communication module 11*a* and a second security module 11*a*. Detection device 12 includes a subscription module 12*a* and a second data switching module 14. These described components, which are apparent in second detailing degree L2 of FIG. 1, may also be designed as components of event chain 100, for example.

Data switching unit 31 of system 200 for monitoring event chain 100 is configured for a bidirectional data exchange between a first component and a second component of event chain 100. Data switching unit 31 may also be configured for switching a data exchange between a multitude of first components within event chain 100 and a multitude of second components 34 within event chain 100. Data switching unit 31, in this case, is configured to receive data sent by the first components, to assign in each case at least a portion of the received data to the second components, and to transfer the assigned data in each case to the second components.

Data switching unit 31 may, for example, be an integral part of control unit 13 of motor vehicle 20. Control unit 13 may, for example, be configured as a braking control unit or a central control unit, e.g., DASy. Data switching unit 31, however, does not necessarily have to be an integral part of control unit 13. Instead, it may also be an integral part of another component of event chain 100, for example of a router or of a switch. The first components are designed as senders of data, while the second components are designed as receivers of data.

Hereafter, a principle of system 200 is essentially explained, by way of example, based on a component designed as an actuator A. However, the principle may also be applied to any other arbitrary component of event chain 100. Actuator A is configured to receive reference variables, disturbance variables, and redundant parameters, and to carry out the at least one semi-automated driving function of motor vehicle 20 based on the reference variables, the disturbance variables, and the redundant parameters. However, the second component may also be designed as a calculation module, for example. A reference variable is an input variable of an actuator. A disturbance variable is a variable acting on the reference variable.

FIG. 2 schematically shows a data flow, switched by a data switching unit, between first components 33 and second components 34 of event chain 100. Data switching unit 31 is an integral part of control unit 13 configured as a central control unit 39 only by way of example. Either second components 34 in each case include a monitoring module 32, or a monitoring module 32 is in each case directly situated at a second component 34. Monitoring modules 32 are not shown in FIG. 2 for the sake of simplicity.

The following description essentially explains the principle underlying system 200 for only one first component 33 and only one second component 34. The following description, however, also applies to a multitude of first and second components 33, 34 wherever only one first component and only one second component 34 are mentioned. In the case of multiple first and second components 33, 34, data switching unit 31 is configured to assign received data to second components 34, and to transfer assigned data in each case to second components 34.

Monitoring module 32 of a second component 34, for example of an actuator A, is configured to check whether a monitoring signal is received, by second component 34, at a basic clock rate 38 via a data link to second component 34. Data switching unit 31 is configured to receive a receiving clock requirement, within which data are to be received and used by second component 34, from second component 34, and to transfer data to second component 34 at a basic clock rate 38 corresponding to the receiving clock requirement or in an integer multiple of basic clock rate 38 corresponding to the receiving clock requirement. Monitoring module 32 is configured to check whether data transferred to second component 34 are received in the receiving clock requirement, and to release data received in the receiving clock requirement for use by second component 34, by which the at least one semi-automated driving function may be carried out in a timely manner.

Second components 34 are designed as actuators A by way of example, FIG. 2 showing a total of three actuators A by way of example. A first actuator 35 may, for example, be designed as a steering device 35. A second actuator 36 may, for example, be designed as a braking device 36. A third actuator 37 may, for example, be designed as a drive 37. For steering device 35 to carry out a sudden lane change or to carry out an evasive maneuver around an obstacle in the lane, for example at a speed of more than 50 km/h, a redundant steering system has to be able to receive new data, for example, every 10 milliseconds, and respond thereto. An electrical braking device 36 necessitates a receiving clock requirement of 100 ms, for example, with the same speed. Drive 37 should receive data, for example, in a receiving clock requirement of 200 ms, with the corresponding speed.

At slower speeds of the motor vehicle, a required receiving clock requirement may be greater, while the required receiving clock requirement may be smaller at higher speeds. However, the required receiving clock requirement may also be continuously adapted based on other system states, weather conditions, roadway conditions, traffic density, etc. As a result of the heartbeat principle, a basic clock rate 38 is provided for transferring data. Basic clock rate 38 may be 2 ms, for example. Basic clock rate 38 may in each case be provided to a first component 33, data switching unit 31, and a second component 34 by a clock generator of the particular component. The clock generators, in turn, may be monitored and synchronized with one another based on basic clock rate 38. Second component 34 may be configured to provide the receiving clock requirement in the form of basic clock rate 38 or an integer multiple of basic clock rate 38. For this purpose, the second component may resort to its clock generator, which is operated in the basic clock rate.

In addition, but not necessarily, data switching unit 31 may be configured to transfer, to first component 33, a sending clock requirement, which corresponds to no more than the receiving clock requirement and in which first component 33 is to send data to data switching unit 31. In this way, data switching unit 31 is configured to adjust a sending clock at first component 33. The sending clock may, for example, correspond to basic clock rate 38 or an integer multiple of basic clock rate 38. In this way, data may be transferred by all first components 33 to second component 34 in the correct clock.

For example, first components 33 may be provided for sending GPS data, traffic data, weather data, sensor data and/or map data to data switching unit 31. At a basic clock rate 38 of 2 ms, first components 33 may, for example, be configured to send data to data switching unit 31 at frequencies of, for example, 1 Hz, 2 Hz, 5 Hz, 10 Hz or 100 Hz.

Monitoring module 32 is configured to transfer an error message to data switching unit 31 in the event that the data are not received by second component 34 in the receiving clock requirement. Data switching unit 31 is configured to transfer data according to a principle established as secure to second component 34, based on the error message.

In the event that data are not received or not received in a timely manner, or are received in a distorted manner by second component 34 and/or data including an incorrect signature are received by second component 34, different errors may be inferred. For example, a latency in the data link to second component 34 may be present, this possibly being a temporary malfunction. It is also possible, for example, that a clock generator of data switching unit 31 or of first component 33 is defective. Monitoring module 33 may report such errors, and data switching unit 31 may advantageously respond thereto and, for example, transfer data to the second component according to a (functionally) safe functioning principle.

If data are not received correctly or not in a timely manner by second component 34, it is possible that second component 34, for example an actuator A, degrades. Advantageously, data switching unit 31 may initiate measures which counteract damage to actuator A. Data switching unit 31 may, for example, initiate a function degradation, this possibly being the initiation of a braking process, for example. Data switching unit 31 may also, for example, switch over to a redundant first component 33, which is able to supply data in a timely manner, it also being possible, for example, to use infrastructure-side sensors S instead of vehicle-side sensors S. Information sources may thus advantageously be prioritized.

Furthermore, data switching unit 31 may, for example, request an error correction from first component 33 and, for example, request a higher clocking. Moreover, control mechanisms may also be activated, which request and activate a brake application and/or a stabilization of a steering system, for example. These control mechanisms initiate functions to provide additional data in an up-to-date manner, initiate a dynamic arbitration, or initiate a function degradation. An arbitration shall be understood to mean an access method for networks in which users assign an access right to one another following a mutual agreement.

FIG. 3 schematically shows method steps 41, 42, 43, 44, 45, 46, 47, 48, 49, 50, 51 of a method 40 for operating system 200. Method 40 is essentially explained for only one first component 33 and only one second component 34. However, method 40 applies similarly to a multitude of first and second components 33, 34.

In a first method step 41, it is checked whether a monitoring signal is received, by second component 34, in basic clock rate 38 via the data link to second component 34. This takes place by monitoring module 32. In an optional second method step 42, the receiving clock requirement is provided by second component 34 in the form of an integer multiple of basic clock rate 38. In a third method step 43, the receiving clock requirement within which data are to be received by second component 34 is received. In the process, data switching unit 31 receives the receiving clock requirement.

In an optional fourth method step 44, a sending clock requirement which corresponds to no more than the receiving clock requirement is transferred from data switching unit 31 to first component 33. In an optional fifth method step 45, data sent by first component 33 are received by data switching unit 31. In an optional sixth method step 46, at least a portion of the received data is assigned to second component 34. This takes place by data switching unit 31. In a seventh method step 47, data are transferred by data switching unit 31 to second component 34 at a basic clock rate 38 corresponding to the receiving clock requirement or in an integer multiple of basic clock rate 38 corresponding to the receiving clock requirement. If optional sixth method step 46 takes place, in seventh method step 47 the transfer of the assigned data to second component 34 takes place.

In an eighth method step 48, it is checked whether data transferred to second component 34 are received in the receiving clock requirement. If this is the case, data received in the receiving clock requirement are used in a ninth method step 49 by second component 34 for carrying out the at least one semi-automated driving function. If the check in eighth method step 48 should show that the data are not received by second component 34 in the receiving clock requirement, an error message is transferred in an optional tenth method step 50. In this case, data are transferred according to a principle established as secure to second component 34 in an optional eleventh method step 51. These data are then used in a ninth method step 49 by second component 34 for carrying out the at least one semi-automated driving function.

Figure 4:
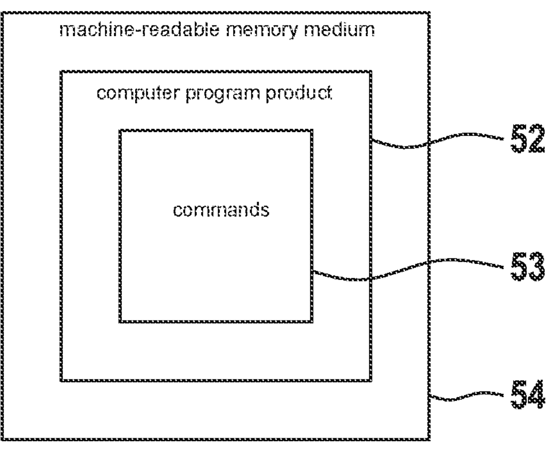
FIG. 4 shows a computer program product for carrying out the method, according to an example embodiment of the present invention.

FIG. 4 schematically shows a computer program product 52 encompassing commands 53 which, during their execution on a computer, prompt the computer to carry out a method 40. Computer program product 52 may, for example, be stored on a machine-readable memory medium 54.

What is claimed is:

1. A system configured to monitor an event chain, the event chain including components for carrying out at least one semi-automated driving function of a motor vehicle, the system comprising:

a processor configured as a data switching unit; and a monitoring module, the data switching unit being configured to switch a data exchange between at least one first component of the components within the event chain and at least one second component of the components within the event chain, the monitoring module being configured to check whether a monitoring signal in the form of a heartbeat signal, which serves as a basis for initiating further time-dependent functions at integer multiples of a base frequency and at fractions of the base frequency, the heartbeat signal being synchronized and monitored for temporal aspects, is received by the second component at a basic clock rate via a data link to the second component, the data switching unit being configured to receive, from the second component, a receiving clock requirement, within which data are to be received by the second component, and to transfer data to the second component at a basic clock rate corresponding to the receiving clock requirement or an integer multiple of the basic clock rate corresponding to the receiving clock requirement, and the monitoring module being configured to check whether data transferred to the second component are received in the receiving clock requirement and to release data received in the receiving clock requirement for use by the second component, wherein the receiving clock requirement provided by the second component is dynamically adjustable based on at least one operating parameter of the motor vehicle, including a vehicle speed or actuator-specific response requirement.

2. The system as recited in claim 1, wherein the data switching unit is configured to transfer, to the first component, a sending clock requirement, which corresponds to no more than the receiving clock requirement and in which the first component is to send data to the data switching unit.

3. The system as recited in claim 1, wherein the second component is configured to provide the receiving clock requirement in the form of the basic clock rate or an integer multiple of the basic clock rate.

4. The system as recited in claim 1, wherein the data switching unit is configured to switch a data exchange between a multitude of first components within the event chain and a multitude of second components within the event chain, the data switching unit being configured to receive data sent by the first components, to assign in each case at least a portion of the received data to the second components, and to transfer the assigned data in each case to the second components.

5. The system as recited in claim 1, wherein the monitoring module is an integral part of the second component or is situated directly at the second component.

6. The system as recited in claim 1, wherein the second component is an actuator, the actuator being configured to receive reference variables and/or disturbance variables and/or redundant parameters and to carry out the at least one semi-automated driving function of the motor vehicle based on the reference variables and/or the disturbance variables and/or the redundant parameters.

7. The system as recited in claim 1, wherein the monitoring module is configured to transfer an error message to the data switching unit in the event that the data is not received by the second component in the receiving clock requirement, the data switching unit being configured to transfer data according to a principle established as secure to the second component based on the error message.

8. The system as recited in claim 1, wherein the components of the event chain include elements from the following group of elements: sensor, sending device, receiving device, detection device, control unit, actuator.

9. A motor vehicle, comprising:

a system configured to monitor an event chain, the event chain including components for carrying out at least one semi-automated driving function of a motor vehicle, the system including:

a data switching unit; and a monitoring module, the data switching unit being configured to switch a data exchange between at least one first component of the components within the event chain and at least one second component of the components within the event chain, the monitoring module being configured to check whether a monitoring signal in the form of a heartbeat signal, which serves as a basis for initiating further time-dependent functions at integer multiples of a base frequency and at fractions of the base frequency, the heartbeat signal being synchronized and monitored for temporal aspects, is received by the second component at a basic clock rate via a data link to the second component, the data switching unit being configured to receive, from the second component, a receiving clock requirement, within which data are to be received by the second component, and to transfer data to the second component at a basic clock rate corresponding to the receiving clock requirement or an integer multiple of the basic clock rate corresponding to the receiving clock requirement, and the monitoring module being configured to check whether data transferred to the second component are received in the receiving clock requirement and to release data received in the receiving clock requirement for use by the second component, wherein the receiving clock requirement provided by the second component is dynamically adjustable based on at least one operating parameter of the motor vehicle, including a vehicle speed or actuator-specific response requirement.

10. A method for operating a system configured to monitor an event chain, the event chain including components for carrying out at least one semi-automated driving function of a motor vehicle, the system including:

a data switching unit; and a monitoring module, the data switching unit being configured to switch a data exchange between at least one first component of the components within the event chain and at least one second component of the components within the event chain, the monitoring module being configured to check whether a monitoring signal in the form of a heartbeat signal, which serves as a basis for initiating further time-dependent functions at integer multiples of a base frequency and at fractions of the base frequency, the heartbeat signal being synchronized and monitored for temporal aspects, is received by the second component at a basic clock rate via a data link to the second component, the data switching unit being configured to receive, from the second component, a receiving clock requirement, within which data are to be received by the second component, and to transfer data to the second component at a basic clock rate corresponding to the receiving clock requirement or an integer multiple of the basic clock rate corresponding to the receiving clock requirement, and the monitoring module being configured to check whether data transferred to the second component are received in the receiving clock requirement and to release data received in the receiving clock requirement for use by the second component;

the method comprising the following steps:

checking whether a monitoring signal is received by the second component at the basic clock rate via the data link to the second component;

receiving the receiving clock requirement, within which data are to be received by the second component;

transferring data, to the second component, at the basic clock rate corresponding to the receiving clock requirement or an integer multiple of the basic clock rate corresponding to the receiving clock requirement;

checking whether data transferred to the second component are received in the receiving clock requirement; and using data received in the receiving clock requirement, wherein the receiving clock requirement provided by the second component is dynamically adjustable based on at least one operating parameter of the motor vehicle, including a vehicle speed or actuator-specific response requirement.

11. The method as recited in claim 10, further comprising: transferring a sending clock requirement, which corresponds to no more than the receiving clock requirement, to the first component.

12. The method as recited in claim 10, further comprising: providing the receiving clock requirement in the form of an integer multiple of the basic clock rate.

13. The method as recited in claim 10, further comprising the following steps:

receiving data sent by the first component;

assigning at least a portion of the received data to the second component; and transferring the assigned data to the second component.

14. A method as recited in claim 12, further comprising: in the event that the data is not received by the second component in the receiving clock requirement:

transferring an error message; and transferring data according to a principle established as secure to the second component based on the error message.

15. A non-transitory computer-readable medium on which is stored a computer program including commands for operating a system configured to monitor an event chain, the event chain including components for carrying out at least one semi-automated driving function of a motor vehicle, the system including:

a data switching unit; and a monitoring module, the data switching unit being configured to switch a data exchange between at least one first component of the components within the event chain and at least one second component of the components within the event chain, the monitoring module being configured to check whether a monitoring signal in the form of a heartbeat signal, which serves as a basis for initiating further time-dependent functions at integer multiples of a base frequency and at fractions of the base frequency, the heartbeat signal being synchronized and monitored for temporal aspects, is received by the second component at a basic clock rate via a data link to the second component, the data switching unit being configured to receive, from the second component, a receiving clock requirement, within which data are to be received by the second component, and to transfer data to the second component at a basic clock rate corresponding to the receiving clock requirement or an integer multiple of the basic clock rate corresponding to the receiving clock requirement, and the monitoring module being configured to check whether data transferred to the second component are received in the receiving clock requirement and to release data received in the receiving clock requirement for use by the second component;

the commands, when executed by a computer, causing the computer to perform the following steps:

checking whether a monitoring signal is received by the second component at the basic clock rate via the data link to the second component;

receiving the receiving clock requirement, within which data are to be received by the second component;

transferring data, to the second component, at the basic clock rate corresponding to the receiving clock requirement or an integer multiple of the basic clock rate corresponding to the receiving clock requirement;

checking whether data transferred to the second component are received in the receiving clock requirement; and using data received in the receiving clock requirement, wherein the receiving clock requirement provided by the second component is dynamically adjustable based on at least one operating parameter of the motor vehicle, including a vehicle speed or actuator-specific response requirement.

* * * * *